Dec. 29, 1931.   B. R. BENJAMIN   1,838,355
CULTIVATOR TOOTH MOUNTING
Filed Dec. 15, 1930
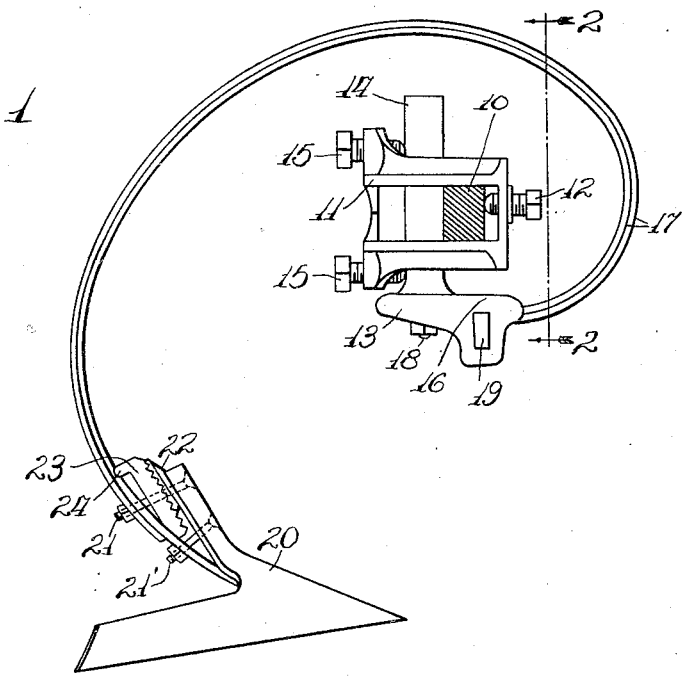
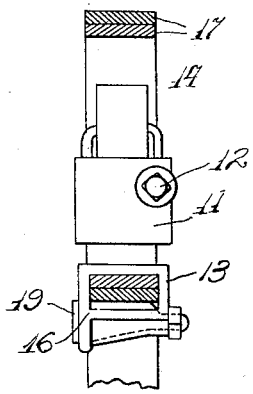
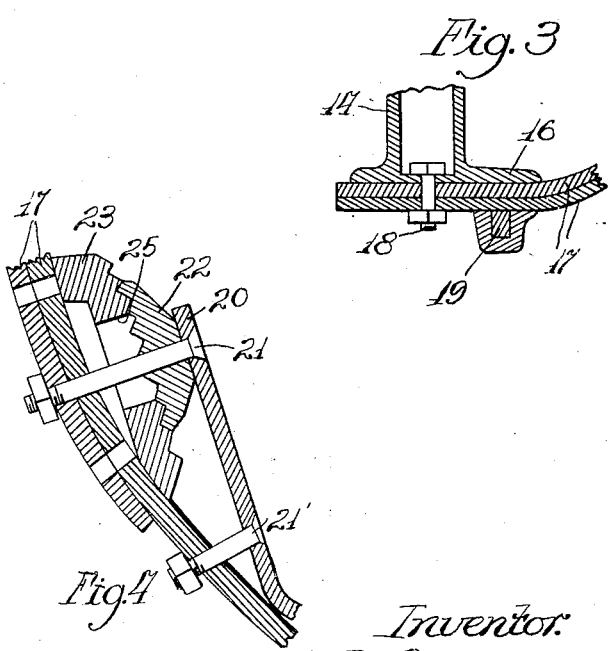
Inventor:
Bert R. Benjamin
By W. P. Doolittle
Atty.

Patented Dec. 29, 1931

1,838,355

UNITED STATES PATENT OFFICE

BERT R. BENJAMIN, OF OAK PARK, ILLINOIS, ASSIGNOR TO INTERNATIONAL HARVESTER COMPANY, A CORPORATION OF NEW JERSEY

CULTIVATOR TOOTH MOUNTING

Application filed December 15, 1930. Serial No. 502,291.

The present invention relates to cultivators, and more particularly to an improved mounting for securing shovels to resilient standards.

The main object of the invention is to provide a mounting for shovels or other soil working elements, which provides means for adjusting the angle of the shovel with respect to the soil.

Another object is to provide a shovel mounting which is particularly adaptable for attaching shovels to spring bar shanks which are extensively used.

The foregoing and other minor objects and advantages are obtained by the combination and details of construction hereinafter more specifically described and illustrated in the accompanying drawings, in which:

Figure 1 is an elevation of a cultivator shovel and the means for attaching it to a cultivator beam, in which the invention is embodied;

Figure 2 is a section taken on the line 2—2 of Figure 1;

Figure 3 is a cross section taken through the center of the structure shown in Figure 2; and, Figure 4 is an enlarged detail section of the means for attaching the cultivator shovel to the shank.

In the present instance the invention is illustrated as embodied in a spring bar shank construction, which is shown attached to a cultivator beam 10. A clamp block 11 is slidably mounted on the beam 10 and is provided with a set screw 12 for clamping the block in position. A member 13 is provided with an upwardly extending portion 14, adapted to be clamped in position with respect to the block 11 by set screws 15. At its lower portion the member 13 is provided with a forward extension 16 through which a spring standard, preferably composed of a pair of flat spring bars 17, extends. The bars 17 are rigidly secured to the member 13 by a bolt 18, extending through the hollow center of the portion 14 and through aligned holes in the bars 17. A wedge member 19 extends through slots formed in the extension 16, below the bars 17. The slots are so positioned and member 19 is so shaped that by tightening said member the bars 17 are firmly clamped against the upper portion of the extension 16. The spring bars 17 extend over the beam 10 and downwardly rearwardly to provide a shank for attaching the cultivator shovel 20.

The shovel shown is of the wide angle type although any form of earthworking tool might be attached in a similar manner. Counter sunk bolts 21 and 21′ extend through cultivator shovel 20 and provide means for attaching said shovel to the spring bars 17. As shown in Figure 4, a plurality of spaced holes are provided at the lower ends of the bars 17 to provide means for adjustably attaching the cultivator shovel and for attaching shovels of a different construction in which the openings for the attaching bolts are spaced different distances apart. The lower bolt 21′ extends through the shovel and through the lower end of one of the spring bars which, as shown, extends below the end of the second spring bar. Said bolt pulls said bar against the under surface of the cultivator shovel. The upper bolt 21 extends through a member 22 and through a member 23. The member 23 is provided with a vertical slot 25 and is corrugated on its forward side. A pair of ears 24, formed as integral extensions from the member 23, are positioned to overlap the side edges of the spring bars 17. The slot 25 in the member 23 forms a means whereby said member may be moved vertically with respect to the member 22 and the spring bar 17, which it abuts, while the bolt 21 is in position. The member 22 is provided on its rear surface with corrugations which mate with the corrugations formed on the member 23.

It will be understood that the structure shown and above described in detail provides means for altering the angular position of the shovel 19 with respect to the shank or spring bars 17. This adjustment is provided by loosening the nut on the bolts 21 and 21′ and vertically altering the position of the member 23. The extensions 24 on said member prevent lateral displacement thereof. The notches formed on the members 22 and 23 securely hold said members in position when the bolts 21 and 21' are again tightened after the desired adjustment has been made. It will be understood that the notches extend laterally all the way across the forward face of the member 23 so that the member 22 may be moved with respect to the member 23 in either direction as far as the slot 25 permits.

Although applicant has shown and described a preferred embodiment of his improved cultivator mounting, it is to be understood that he contemplates the use of all modifications and limits his invention only within the scope of the appended claims.

What is claimed is:

1. A cultivating unit comprising a downwardly extending shank adapted to be connected to a crosshead, a shovel attached to said shank by a bolt, a wedge-shaped adjusting member provided between the fastening portion of the shovel and the shank, said member having a slot through which the bolt passes, said slot providing for vertical movement of said member, and a second member positioned between the shovel and the shank provided with a hole through which said bolt passes, said member engaging the wedge-shaped member, said two members being provided with mating engaging notches whereby the wedge-shaped member may be moved vertically relative to the second named member to provide for angular adjustment of the cultivator shovel.

2. A cultivating unit comprising a downwardly extending shank adapted to be connected to a crosshead, a shovel attached to said shank by vertically spaced bolts, a wedge-shaped adjusting member provided between the fastening portion of the shovel and the shank, said member having a slot through which one of the bolts passes, said slot providing for vertical movement of said member, and a second member positioned between the shovel and the shank provided with a hole through which said bolt passes, said member engaging the wedge-shaped member, said two members being provided with mating engaging notches whereby the wedge-shaped member may be held in a plurality of positions relative to the second named member to provide for angular adjustment of the cultivator shovel.

3. A cultivating unit comprising a downwardly extending shank adapted to be connected to a crosshead, a shovel attached to said shank by spaced bolts, a wedge-shaped adjusting member provided between the fastening portion of the shovel and the shank, said member having a slot through which the upper bolt passes, said slot providing for vertical movement of said member, and a second member positioned between the shovel and the shank provided with a hole through which said bolt passes, said member engaging the wedge-shaped member, said two members being provided with mating engaging notches whereby the wedge-shaped member may be held in a plurality of positions relative to the second named member to provide for angular adjustment of the cultivator shovel.

4. A cultivating unit comprising a downwardly extending shank adapted to be connected to a crosshead, a shovel attached to said shank by spaced bolts, a wedge-shaped adjusting member spaced between the fastening portion of the shovel and the shank, said member having a slot through which the upper bolt passes, said slot providing for vertical movement of said member and lugs positioned to overlap the sides of the shank whereby said member is locked against lateral movement, and a second member positioned between the shovel and the shank and rigidly secured with respect to the shovel, said member engaging the wedge-shaped member, said two members being provided with mating engaging notches whereby the wedge-shaped member may be moved vertically relative to the second named member to provide for angular adjustment of the cultivator shovel.

In testimony whereof I affix my signature.

BERT R. BENJAMIN.